(12) United States Patent
Endo et al.

(10) Patent No.: US 10,615,671 B2
(45) Date of Patent: Apr. 7, 2020

(54) STATOR AND METHOD FOR MANUFACTURING STATOR

(71) Applicant: AISIN SEIKI KABUSHIKI KAISHA, Kariya-shi (JP)

(72) Inventors: Hiroki Endo, Anjo (JP); Hiroyuki Kawada, Anjo (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 319 days.

(21) Appl. No.: 15/706,968

(22) Filed: Sep. 18, 2017

(65) Prior Publication Data

US 2018/0083516 A1    Mar. 22, 2018

(30) Foreign Application Priority Data

Sep. 20, 2016 (JP) ................. 2016-182846

(51) Int. Cl.
| | |
|---|---|
| H02K 15/00 | (2006.01) |
| H02K 3/52 | (2006.01) |
| H02K 15/12 | (2006.01) |
| H02K 5/167 | (2006.01) |
| H02K 5/128 | (2006.01) |
| H02K 11/33 | (2016.01) |
| H02K 7/14 | (2006.01) |
| H02K 1/16 | (2006.01) |
| H02K 5/08 | (2006.01) |

(52) U.S. Cl.
CPC .......... *H02K 15/0043* (2013.01); *H02K 1/16* (2013.01); *H02K 3/522* (2013.01); *H02K 5/08* (2013.01); *H02K 5/128* (2013.01); *H02K 5/1675* (2013.01); *H02K 5/1677* (2013.01); *H02K 7/14* (2013.01); *H02K 11/33* (2016.01); *H02K 15/0068* (2013.01); *H02K 15/12* (2013.01); *H02K 2203/03* (2013.01)

(58) Field of Classification Search
CPC ........ H02K 15/0043; H02K 1/16; H02K 5/08; H02K 15/0068
See application file for complete search history.

(56) References Cited

U.S. PATENT DOCUMENTS 6,075,304 A * 6/2000 Nakatsuka ............. H02K 3/345
                                                                  29/596
8,335,840 B2   12/2012 Shichino
(Continued)

FOREIGN PATENT DOCUMENTS

| JP | 2004-328818 | 11/2004 |
|---|---|---|
| JP | 2009-44797 | 2/2009 |

(Continued)

*Primary Examiner* — Emily P Pham
(74) *Attorney, Agent, or Firm* — Oblon, McClelland, Maier & Neustadt, L.L.P.

(57) ABSTRACT

A stator includes: a stator core in which a coil strand is wound around each of a plurality of teeth portions formed in an annular yoke portion; an annular plate that is disposed at a position overlapping an annular portion of the stator core in a direction along an axial center of the stator core; a plurality of terminals which are supported by the plate and to which end portions of a plurality of the coil strands drawn out from the stator core are respectively connected; and a resin that encloses the stator core and the plate in a state where a part of the plurality of terminals is exposed.

6 Claims, 5 Drawing Sheets

(56) References Cited

U.S. PATENT DOCUMENTS

| | | | |
|---|---|---|---|
| 2008/0048508 A1* | 2/2008 | Shimoyama | B29C 45/14639 310/43 |
| 2012/0126646 A1* | 5/2012 | Nakagawa | H02K 3/522 310/71 |
| 2015/0263581 A1* | 9/2015 | Yamamoto | H02K 29/08 310/43 |

FOREIGN PATENT DOCUMENTS

| | | |
|---|---|---|
| JP | 2009-201098 | 9/2009 |
| JP | 2012-257433 | 12/2012 |
| JP | 2016-82643 | 5/2016 |

* cited by examiner

STATOR AND METHOD FOR MANUFACTURING STATOR

CROSS REFERENCE TO RELATED APPLICATIONS

This application is based on and claims priority under 35 U.S.C. § 119 to Japanese Patent Application 2016-182846, filed on Sep. 20, 2016, the entire contents of which are incorporated herein by reference.

TECHNICAL FIELD

This disclosure relates to a resin-molded stator and a method for manufacturing a stator.

BACKGROUND DISCUSSION

As the stator having the configuration described above, a technique, in which a stator core is formed by winding a coil strand around a tooth portion of an annular core, the stator core is inserted into the resin to produce a stator in a state where an end portion of each coil strand is drawn out from a hole portion of an annular plate disposed on an end surface of the stator core, is disclosed in JP 2016-82643A (Reference 1).

In the technique disclosed in Reference 1, in order to connect a bus bar to an exposed portion of the coil strand, an entire stator core is inserted in the resin so that the coil strand is exposed from the resin to the outside.

As disclosed in Reference 1, a configuration in which the stator core is molded to the resin by an insert molding technique is important from a viewpoint of enhancing waterproofness.

However, in the configuration disclosed in Reference 1, since the coil strands drawn out from the teeth portions are inserted through the hole portions corresponding to the number of the teeth portions, the process tends to be complicated. In addition, in a process of connecting the bus bar to the coil strand after the stator core is molded with the resin, improvement is desired because the number of connection points increases.

Thus, a need exists for a resin-molded stator and a method for manufacturing a stator.

SUMMARY

A feature of a stator according to an aspect of this disclosure resides in that the stator includes a stator core in which a coil strand is wound around each of a plurality of teeth portions formed in an annular yoke portion; an annular plate that is disposed at a position overlapping an annular portion of the stator core in a direction along an axial center of the stator core; a plurality of terminals which are supported by the plate and to which end portions of a plurality of the coil strands drawn out from the stator core are respectively connected; and a resin that encloses the stator core and the plate in a state where a part of the plurality of terminals is exposed.

A feature of a method for manufacturing a stator according to another aspect of this disclosure resides in that the method includes a step of forming a stator core for forming a stator core by winding a coil strand around each of a plurality of teeth portions formed in an annular yoke portion; a step of connecting a plurality of end portions of the coil strand drawn out from the stator core to each of a plurality of terminals included in an annular plate disposed at a position overlapping an annular portion of the stator core in a direction along an axial center of the stator core; and a step of molding for enclosing the stator core and the plate in a resin in a state where a part of the plurality of terminals is exposed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the drawings.

Basic Configuration

Figure 1:
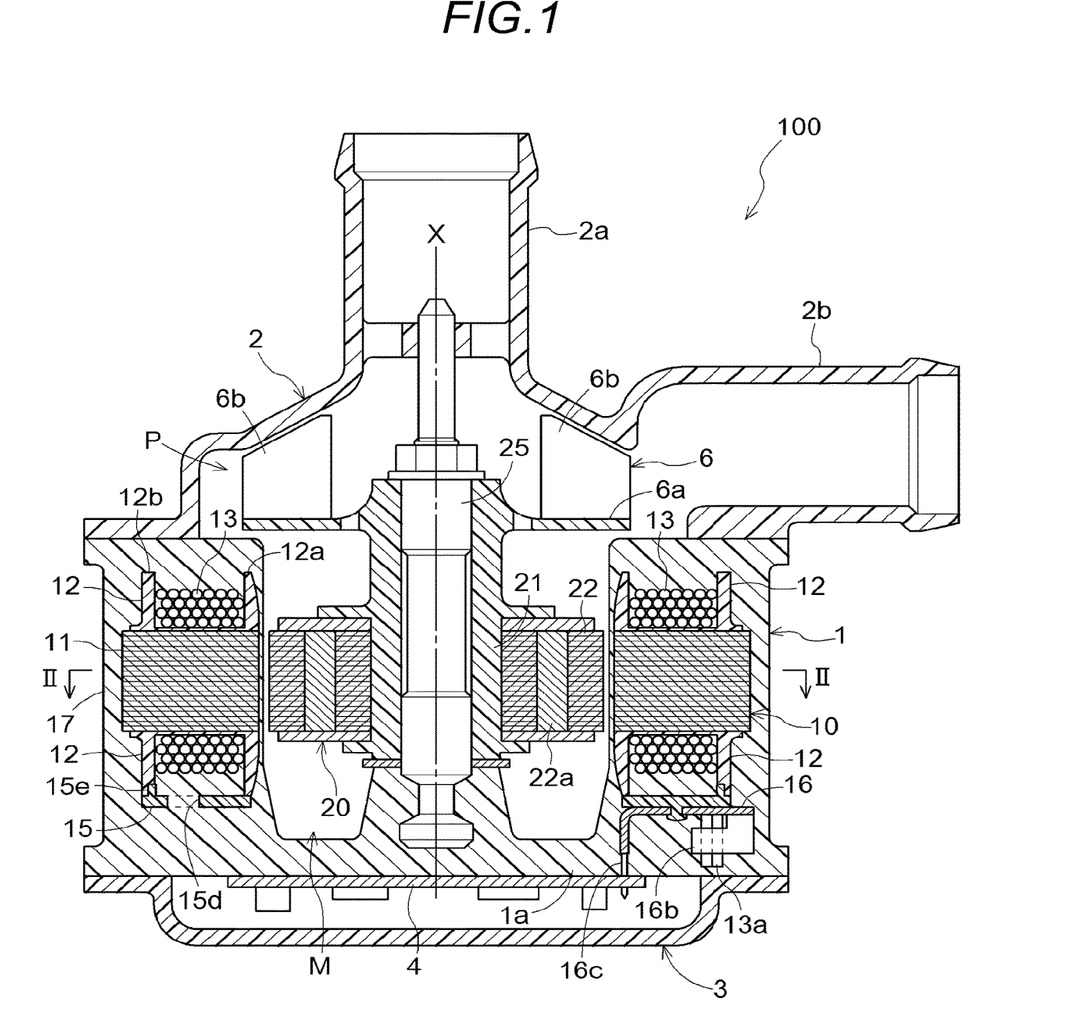
FIG. 1 is a sectional view of a water pump.

As illustrated in FIG. 1, a water pump 100 is constituted by connecting a motor housing 1 constituting a motor portion M, a pump housing 2 constituting a pump portion P, and a control housing 3 for controlling a rotation of a pump rotor 6 by the motor portion M.

Figure 2:
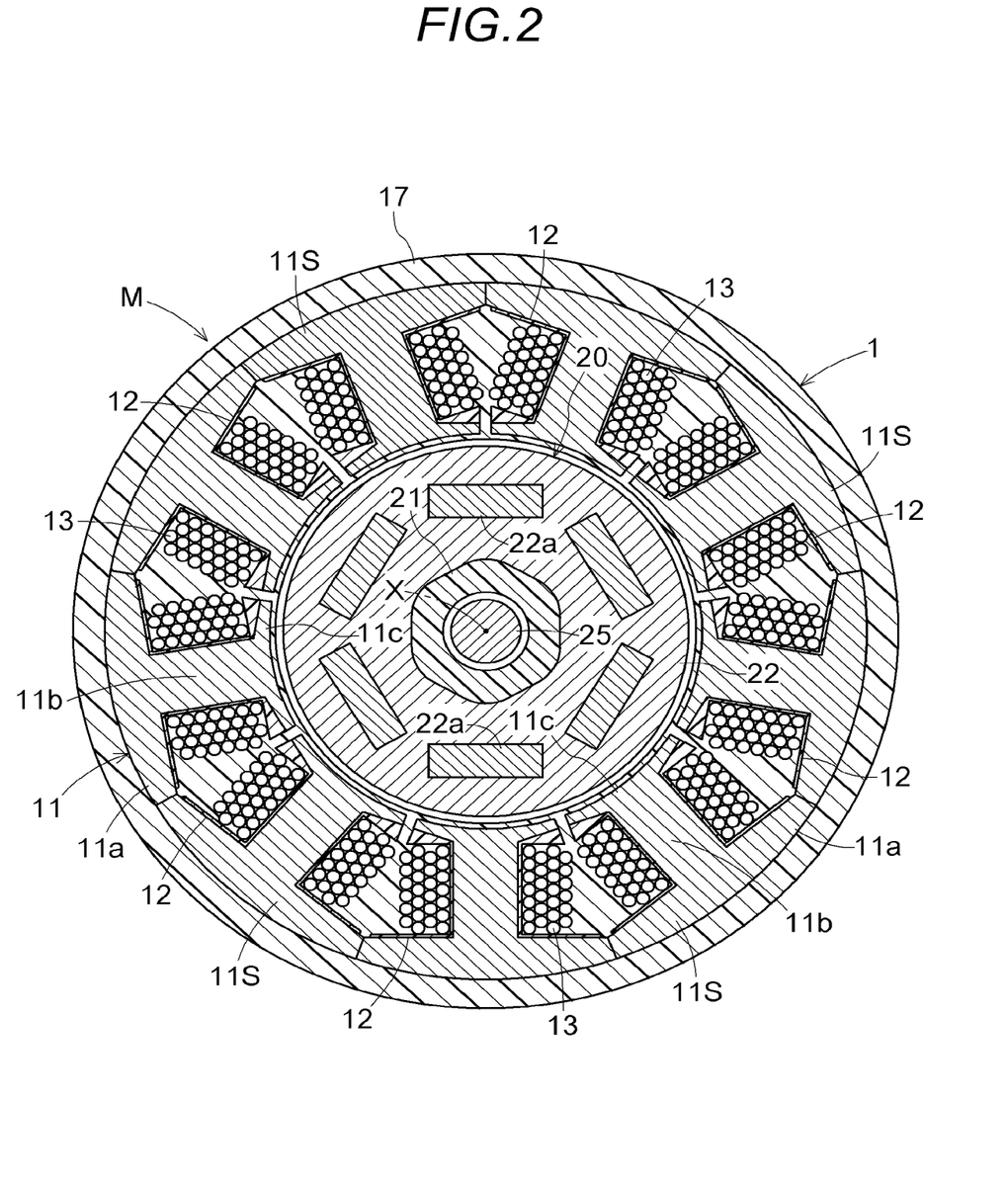
FIG. 2 is a sectional view that is taken along line II-II of FIG. 1.
Figure 3:
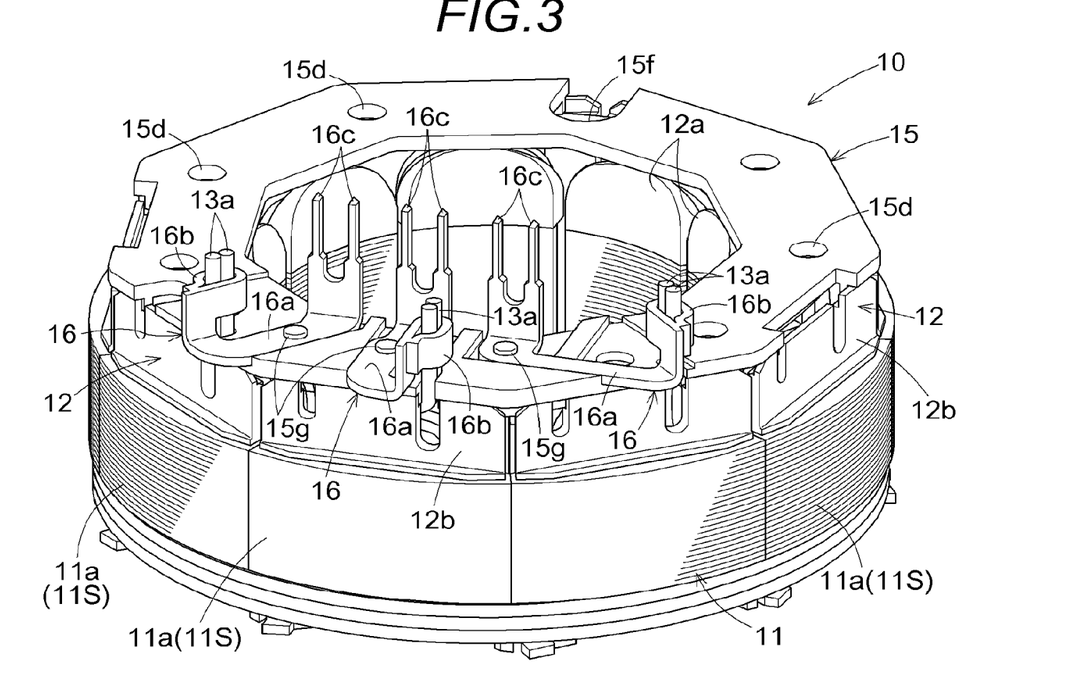
FIG. 3 is a perspective view of a stator.

The water pump 100 circulates cooling water between an engine and a radiator in a vehicle such as an automobile. As illustrated in FIGS. 1 to 3, the motor portion M includes an annular stator 10 integrally formed with the motor housing 1 and a motor rotor 20 rotatably supported around a rotation axial center X.

The motor portion M is constituted as a brushless DC motor and the stator 10 has a structure common to a three-phase motor.

The pump housing 2 is connected to one end portion of the motor housing 1 and is formed in a centrifugal type including a suction cylinder 2a for sucking the cooling water and a discharge cylinder 2b for sending out the cooling water. A support shaft 25 coaxial with the rotation axial center X from a partition wall 1a formed in the motor housing 1 in a posture orthogonal to the rotation axial center X to an inside of the suction cylinder 2a of the pump housing is provided. The motor rotor 20 is rotatably supported with respect to the support shaft 25.

The control housing 3 is constituted by a cover member provided on a side opposite to the pump housing 2 in the motor housing 1. A control board 4 is provided further inside than the control housing 3. In addition, the pump rotor 6 is integrally formed with the motor rotor 20 and the pump rotor 6 forms a plurality of impellers 6b on a disk 6a.

Motor Portion

As illustrated in FIGS. 1 to 5, the motor portion M includes the annular stator 10 integrally formed with the motor housing 1 and the motor rotor 20 rotatably supported with respect to the support shaft 25. The motor rotor 20 includes a rotor core 22 having six permanent magnets 22a at one end portion of a resin rotor body 21. In addition, the disk 6*a* of the pump rotor 6 is formed at the other end portion of the rotor body 21.

The stator 10 includes an annular stator core 11 with the rotation axial center X as a center, an annular plate 15 with the rotation axial center X as a center, a plurality (three) of terminals 16, and a resin 17 for molding the stator core 11 and the plate 15 in a state where a part of the plurality of terminals 16 is exposed. The plate 15 is disposed at a position overlapping the annular stator core 11 in a direction along the rotation axial center X.

Figure 4:
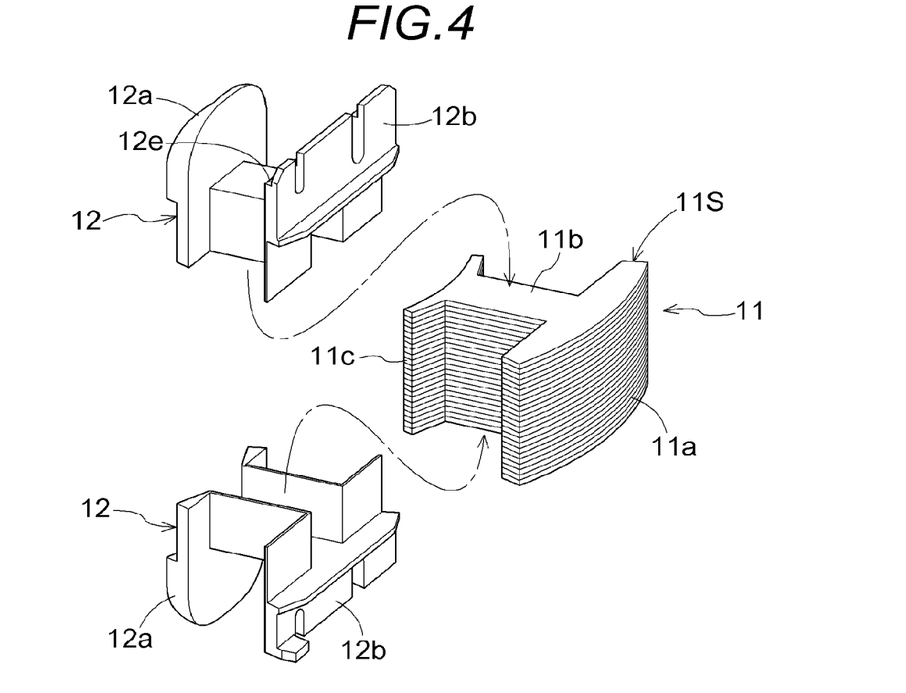
FIG. 4 is an exploded perspective view of a stator core and an insulator.

The stator core 11 is formed by arranging a plurality (nine) of divided cores 11S formed by laminating a plurality of magnetic steel plates in a circumferential direction. Each of the divided cores 11S has an outer peripheral-side yoke portion 11*a*, an intermediate tooth portion 11*b*, and an inner peripheral-side flange portion 11*c*, and is covered with an insulator 12 made of an insulating resin.

As illustrated in FIG. 4, the insulator 12 is constituted of two members disposed in a laminating direction of the magnetic steel plates so as to surround each divided core 11S. That is, the insulator 12 constituted of the two members is integrally formed with an inner flange portion 12*a* disposed on an inner periphery side of the stator 10 and an outer flange portion 12*b* disposed on an outer periphery side, and a coil strand 13 is wound around an intermediate portion between the inner flange portion 12*a* and the outer flange portion 12*b*. An insulating film is formed on the coil strand 13. The insulating film is removed by heating exceeding a set temperature and a material having a property of exposing a conductor of a strand is used.

In such a configuration, in a state where end surfaces in a circumferential direction of the yoke portions 11*a* of the plurality (nine) of divided cores 11S abut against each other, the end surfaces are restrained, and thereby the annular stator core 11 is formed.

Particularly, a total three coil strands 13 are used by winding one coil strand 13 around a plurality of in-phase teeth portions 11*b* (more precisely, winding around the insulators 12). Strand ends 13*a* are drawn out from three positions in a state where the strand ends 13*a* (end portions of the strand) of two coil strands 13 in three coil strands 13 are bundled together. Moreover, Y connection or Δ connection is realized by connecting the strand end 13*a* which is drawn out as described above, to the terminal 16.

Figure 5:
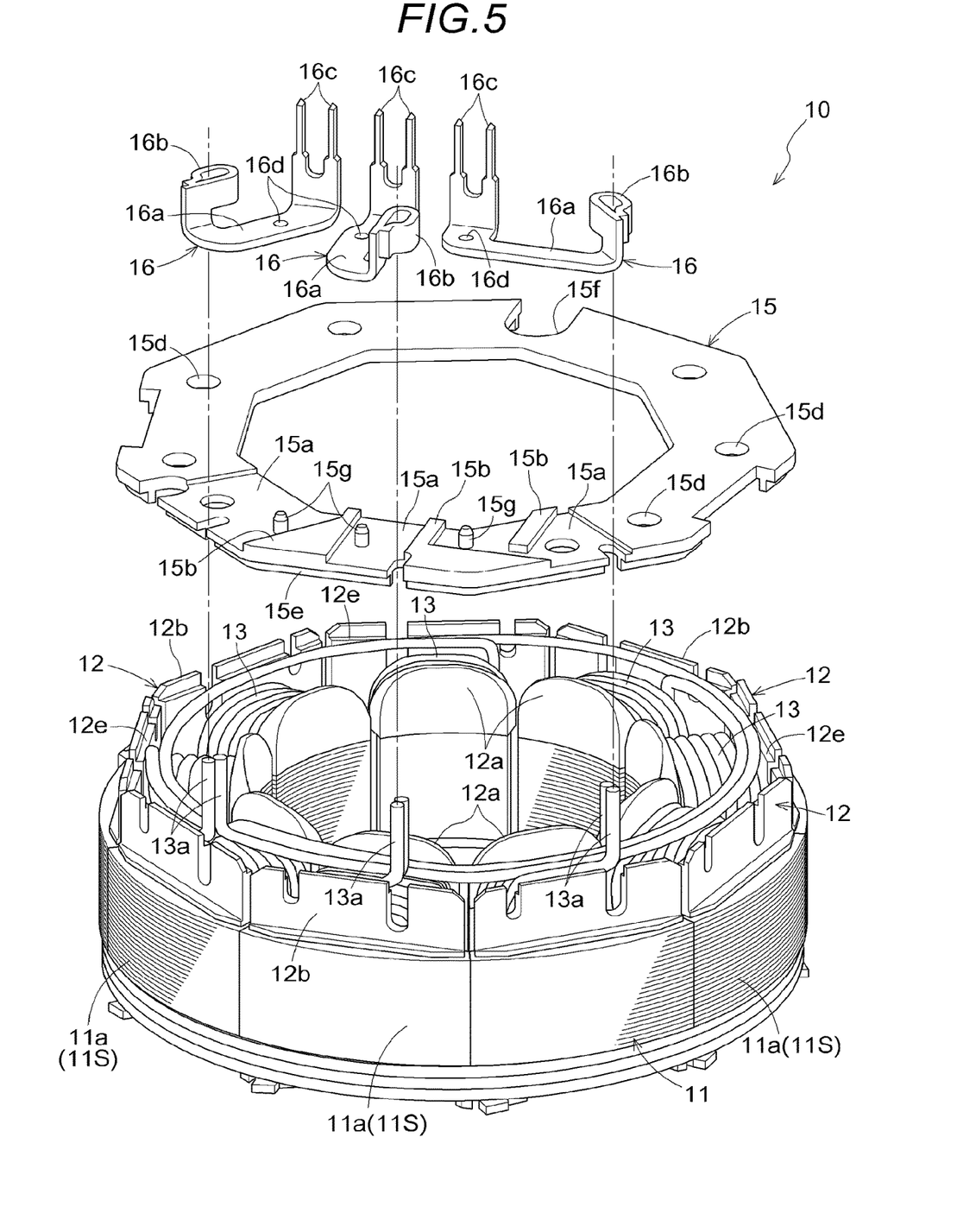
FIG. 5 is an exploded perspective view of the stator.

As illustrated in FIGS. 3 and 5, the three terminals 16 have different shapes respectively and a base portion 16*a*, a coil connection portion 16*b*, and a board connection portion 16*c* are formed by pressing a plate material of a good conductor such as a copper alloy. In addition, a holding hole portion 16*d* is bored in the base portion 16*a*.

The base portion 16*a* is formed flat. The coil connection portion 16*b* is formed in a posture rising in a perpendicular direction from the base portion 16*a* and has an insertion space through which the strand end 13*a* is able to be inserted. The board connection portion 16*c* is formed in a bifurcated shape.

As illustrated in FIGS. 3 and 5, the plate 15 is formed of a resin material so as to be annular to overlap the annular portion of the stator core 11 in a direction along the rotation axial center X. Engagement holding portions 15*a* individually supporting the plurality (three) of terminals 16, a plurality of through holes 15*d*, and a position alignment portion 15*f* formed by cutting a part of the outer periphery are bored in the plate 15.

The engagement holding portion 15*a* is formed to be recessed having a depth (depth equal to a thickness of the base portion 16*a*) into which the base portions 16*a* of the three terminals 16 are fitted, and a separation projection portion 15*b* is formed at an intermediate position of the engagement holding portions 15*a* in an adjacent position relationship. A holding shaft 15*g* inserted through each of the holding hole portions 16*d* of the three terminals 16 is formed in each of the engagement holding portions 15*a*. A part of the plurality of through holes 15*d* is disposed at a position overlapping a space of the intermediate position of the coil strand 13 wound around the adjacent teeth portions 11*b* in the direction along the rotation axial center X.

When assembling the stator 10, the holding shaft 15*g* is inserted through the holding hole portion 16*d* of the terminal 16 and a portion of the holding shaft 15*g* exposed from the base portion 16*a* is used for heat caulking to form a large diameter by heating and pressing.

In addition, an engaging portion 15*e* is formed so as to protrude on a surface of the plate 15 facing the stator core 11. A recessed engaged portion 12*e* able to be engaged with the engaging portion 15*e* is formed at an inner periphery portion of the outer flange portion 12*b* in the insulator 12.

Method for Manufacturing Stator

Figure 7:
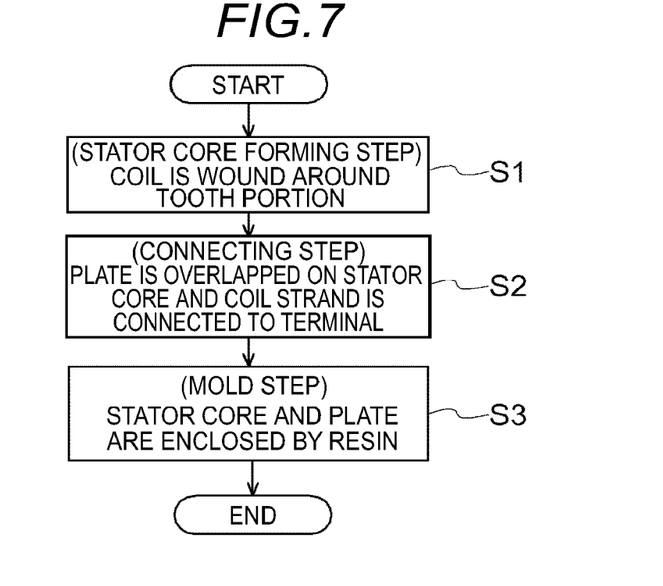
FIG. 7 is a flow chart of a method for manufacturing a stator.

As illustrated in FIG. 7, the stator 10 of the water pump 100 is manufactured by sequentially executing a stator core forming step S1, a connecting step S2, and a mold step S3.

In the stator core forming step S1, the insulator 12 is set in each of the nine divided cores 11S and the coil strand 13 is wound around the insulator 12, and as illustrated in FIG. 5, the nine divided cores 11S are disposed in an annular shape, the end surfaces of the yoke portions 11*a* in the circumferential direction abut against each other, and the end surfaces are restrained. In addition, as an object to wind the coil strand 13, instead of the divided core 11S, the annular stator core 11 that is not divided may be used.

In the stator core forming step S1, the annular stator core 11 in which the coil strand 13 is wound around the tooth portion 11*b* is formed. In addition, when winding the coil strand 13, one coil strand 13 is wound around three teeth portions 11*b* that are in phase with a three phase coil. Therefore, three coil strands 13 are used.

Particularly, when the coil strand 13 is wound, one strand end 13*a* (end portion of a winding start) and the other strand end 13*a* (end portion of a winding end) are drawn out to one side (upper side in FIGS. 3 and 5) of the stator core 11. In addition, two strand ends 13*a* of the three coil strands 13 are bundled thereby corresponding to Y connection or Δ connection.

Next, in the connecting step S2, the plate 15 is disposed at an end portion of the stator core 11 on a side in which the strand end 13*a* is drawn out and as illustrated in FIG. 3, the end portion of the coil strand 13 is connected to the coil connection portion 16*b* of the terminal 16 in an insertion state.

In the connecting step S2, a posture of the plate 15 is appropriately set with the rotation axial center X as a center, the engaging portion 15*e* is engaged with the engaged portion 12*e* of the outer flange portion 12*b*, and thereby the position of the plate 15 in the direction along the rotation axial center X is appropriately set based on the position of the position alignment portion 15*f*.

In addition, when disposing the plate 15, the terminal 16 is held in each of the three engagement holding portions 15*a* in advance by heat caulking described above and two strand ends 13*a* of the coil strand 13 are bundled and inserted through the coil connection portion 16*b*. In addition, the work of supporting the terminals 16 on the three engagement holding portions 15a may be performed after setting the plate 15.

The insulating film of two strand ends 13a is removed by heat by applying a pressure while heating the coil connection portion 16b using a connection tool and the two strand ends 13a are inserted through the inside surface of the coil connection portion 16b in a pressed state.

In addition, in the connecting step S2, since the two strand ends 13a and the coil connection portion 16b are connected on an upper surface of the plate 15, for example, under a situation in which the coil strand 13 other than the end portion is present in the vicinity of the connection position, inconvenience that the connection tool is inadvertently brought into contact with the coil strand 13 and the insulating film melts can be avoided.

Figure 6:
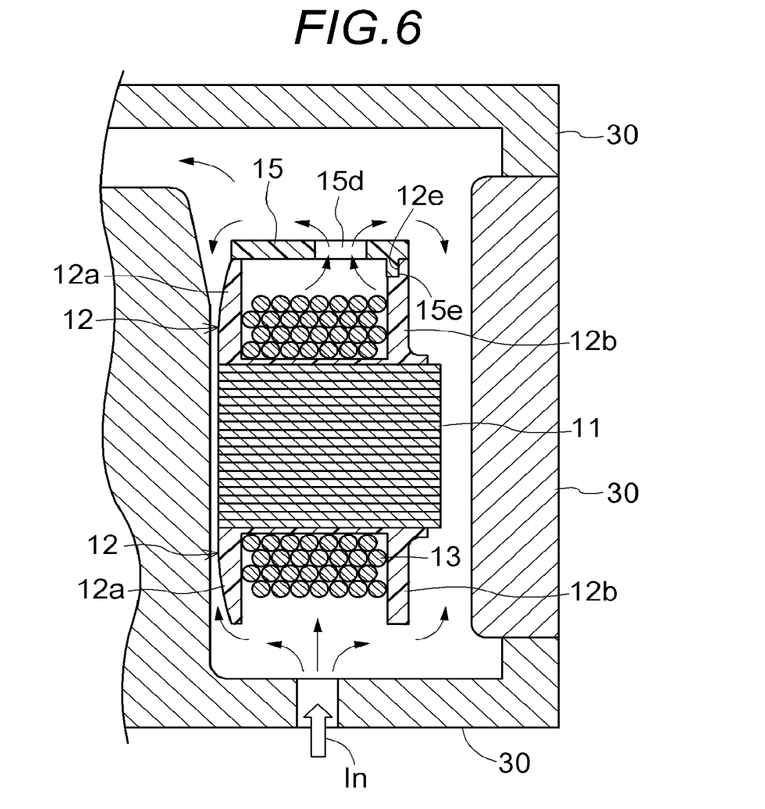
FIG. 6 is a sectional view illustrating the stator accommodated in a mold.

In the mold step S3, as illustrated in FIG. 6, the stator core 11, the plate 15, and a part of the terminals 16 are accommodated in a cavity of a mold 30, and a process of injecting the resin into the cavity is performed.

In the mold step S3, the resin of a melted state is injected to a portion at which the stator core 11 is disposed in a direction of arrow In from a side opposite to the end portion at which the plate 15 is disposed. The resin flows as indicated by arrows in FIG. 6 and the cavity is filled with the resin by injection of the resin. In addition, when the resin flows, the resin flows through a gap of the intermediate position of the coil strand 13 wound around the adjacent insulators 12 (teeth portions 11b) and reaches the position of the plate 15. As described above, in a case where the resin reaches the position of the plate 15, the resin flows to pass through the through hole 15d and a pressure from the resin does not act on the plate 15.

The stator core 11, the plate 15, and a part of the terminals 16 form the stator 10 molded with the resin 17 by performing the mold step S3. Particularly, in the mold step S3, a process of inserting the support shaft 25 into the partition wall 1a is also performed at the same time, thereby forming the motor housing 1.

Assembling of Water Pump

The stator 10 manufactured by the manufacturing method is integrally formed with the motor housing 1. Therefore, the motor rotor 20 is disposed on the inside of the stator 10 (pump rotor 6 is also disposed at the same time), the pump housing 2 is attached, the board connection portion 16c of the terminal 16 exposed from the resin 17 is connected to a print winding of the control board 4 with solder or the like, and the control housing 3 is attached to complete the water pump 100.

As described above, the stator 10 molded with the resin 17 is formed so that it is possible to not only directly connect the print winding of the control board 4 to the terminal 16 but also to complete the connection process in a short period of time because the number of the terminals 16 is only three.

In addition, in the connecting step S2, it is possible to prevent disadvantage that heat during connection damages the insulating film of the coil strand 13. Moreover, when the resin flows through the inside of the mold 30 during molding with the resin 17, it is possible to solve disadvantage that position of the plate 15 fluctuates due to the pressure of the resin by using the plate 15.

The disclosure can be applied to the resin-molded stator and the method for manufacturing a stator.

A feature of a stator according to an aspect of this disclosure resides in that the stator includes a stator core in which a coil strand is wound around each of a plurality of teeth portions formed in an annular yoke portion; an annular plate that is disposed at a position overlapping an annular portion of the stator core in a direction along an axial center of the stator core; a plurality of terminals which are supported by the plate and to which end portions of a plurality of the coil strands drawn out from the stator core are respectively connected; and a resin that encloses the stator core and the plate in a state where a part of the plurality of terminals is exposed.

According to this configuration, since the terminal to which the end portion of the coil strand is connected is in a state of being exposed from the resin, it is possible to directly connect the terminal to winding of a control board. In addition, since a plurality of the end portions among terminals of the plurality of coil strands wound around a plurality of the yoke portions, it is possible to reduce the number of portions connecting to a board or a bus bar compared to a configuration in which all the end portions of the coil strands wound around one tooth portion are drawn out from the resin because the plurality of end portions are connected to the terminal.

Therefore, a stator, which facilitates electrical connection to the coil strand while taking advantage of effectiveness of being molded with resin, is configured.

As another configuration, a through hole may be bored in the plate at a position overlapping an intermediate position of the coil strand wound around ones of the plurality of teeth portions which are adjacent to each other in a circumferential direction.

According to this configuration, for example, when the stator core is accommodated in a cavity of a mold and filled with the resin, in a case where the resin flows in a direction (direction along a center axis of the annular stator core) orthogonal to a plate surface of the plate, the resin flowing through a space between the coil strands wound around the adjacent teeth portions flows through the through hole of the plate. Therefore, there is no possibility of changing the position of the plate by reducing pressure acting on the plate.

As another configuration, an engagement holding portion for individually engaging and holding the plurality of terminals may be separated by a separation projection portion separating the terminals respectively.

According to this configuration, it is possible to hold the plurality of terminals in an engagement state with the engagement holding portion and adjacent terminals among the held terminals are disposed by being separated by the separation projection portion therebetween. Therefore, it is possible to suppress approach between the terminals and to maintain terminal insulating property high.

As another configuration, an insulator may be disposed along an outer periphery of the yoke portion and a part of the plate may engage with the insulator.

According to this configuration, a part of the plate engages with the insulator and thereby it is possible to maintain a state in which respective positional relationships are determined.

A feature of a method for manufacturing a stator according to another aspect of this disclosure resides in that the method includes a step of forming a stator core for forming a stator core by winding a coil strand around each of a plurality of teeth portions formed in an annular yoke portion; a step of connecting a plurality of end portions of the coil strand drawn out from the stator core to each of a plurality of terminals included in an annular plate disposed at a position overlapping an annular portion of the stator core in a direction along an axial center of the stator core; and a step of molding for enclosing the stator core and the plate in a resin in a state where a part of the plurality of terminals is exposed.

According to this configuration, it is possible to manufacture a stator in a state where the terminal to which the end portion of the coil strand is connected is exposed from the resin and also to directly connect the terminal to winding of a control board. In addition, the plurality of end portions among the terminals of the plurality of coil strands wound around the plurality of teeth portions are connected to the terminals. Therefore, for example, it is possible to reduce the number of portions connecting to a board or a bus bar compared to a configuration in which all the end portions of the coil strands wound around one yoke portion are drawn out from the resin.

Therefore, a stator, which facilitates electrical connection to the coil strand while taking advantage of effectiveness of being molded with resin, is configured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A stator comprising:
a stator core in which a plurality of coil stands are respectively wound around each of a plurality of tooth portions formed in an annular yoke portion;
an annular plate that is disposed at a position overlapping an annular portion of the stator core in a direction along an axial center of the stator core;
a plurality of terminals which are supported by the annular plate and to which end portions of the plurality of coil strands drawn out from the stator core are respectively connected; and
a resin that encloses the stator core and the annular plate in a state where a part of the plurality of terminals is exposed.

2. The stator according to claim 1,
wherein a through hole is bored in the annular plate at a position overlapping an intermediate position of the coil strand wound around ones of the plurality of tooth portions which are adjacent to each other in a circumferential direction.

3. The stator according to claim 1,
wherein an engagement holding portion for individually engaging and holding the plurality of terminals is separated by a separation projection portion separating the plurality of terminals respectively.

4. The stator according to claim 1,
wherein an insulator is disposed along an outer periphery of the annular yoke portion and a part of the annular plate engages with the insulator.

5. A stator comprising:
a stator core in which a plurality of coil stands are respectively wound around each of a plurality of tooth portions formed in an annular yoke portion;
an annular plate that is disposed at a position overlapping an annular portion of the stator core in a direction along an axial center of the stator core;
a plurality of terminals which are supported by the annular plate and to which end portions of the plurality of coil strands drawn out from the stator core are respectively connected; and
a resin that encloses the stator core and the annular plate in a state where a part of the plurality of terminals is exposed,
wherein a through hole is bored in the annular plate at a position overlapping an intermediate position of a coil strand of the plurality of coil strands respectively wound around ones of the plurality of tooth portions which are adjacent to each other in a circumferential direction,
an engagement holding portion for individually engaging and holding the plurality of terminals is separated by a separation projection portion separating the plurality of terminals respectively, and
an insulator is disposed along an outer periphery of the yoke portion and a part of the annular plate engages with the insulator.

6. A method for manufacturing a stator comprising:
a stator core forming step of forming a stator core by winding a coil strand around each of a plurality of tooth portions formed in an annular yoke portion;
a connecting step of connecting a plurality of end portions of the coil strand drawn out from the stator core to each of a plurality of terminals included in an annular plate disposed at a position overlapping an annular portion of the stator core in a direction along an axial center of the stator core; and
a molding step of enclosing the stator core and the annular plate with a resin in a state where a part of the plurality of terminals is exposed.

* * * * *